United States Patent
Colombo et al.

(10) Patent No.: US 10,092,024 B2
(45) Date of Patent: Oct. 9, 2018

(54) ACTIVE PACKAGE

(71) Applicant: SAES GETTERS S.P.A., Lainate (IT)

(72) Inventors: Alessandra Colombo, Milan (IT); Paolo Vacca, Milan (IT); Miriam Riva, Casatenovo (IT)

(73) Assignee: SAES GETTERS S.P.A., Lainate (IT)

(*) Notice: Subject to any disclaimer, the term of this patent is extended or adjusted under 35 U.S.C. 154(b) by 0 days.

(21) Appl. No.: 15/531,410

(22) PCT Filed: Jan. 27, 2016

(86) PCT No.: PCT/IB2016/050401
§ 371 (c)(1),
(2) Date: May 26, 2017

(87) PCT Pub. No.: WO2016/125050
PCT Pub. Date: Aug. 11, 2016

(65) Prior Publication Data
US 2017/0311637 A1 Nov. 2, 2017

(30) Foreign Application Priority Data

Feb. 2, 2015 (IT) .............. MI2015A0131

(51) Int. Cl.
| | |
|---|---|
| B01J 20/18 | (2006.01) |
| A23L 3/3427 | (2006.01) |
| B65D 81/28 | (2006.01) |
| B01J 20/26 | (2006.01) |
| B01J 20/28 | (2006.01) |
| B01J 20/30 | (2006.01) |

(52) U.S. Cl.
CPC ............ *A23L 3/3427* (2013.01); *B01J 20/18* (2013.01); *B01J 20/26* (2013.01); *B01J 20/28004* (2013.01); *B01J 20/2805* (2013.01); *B01J 20/28007* (2013.01); *B01J 20/28016* (2013.01); *B01J 20/3085* (2013.01); *B65D 81/28* (2013.01); *A23V 2002/00* (2013.01)

(58) Field of Classification Search
CPC ............ B01J 20/28016; B01J 20/28007; B01J 20/28004; B01J 20/26; B01J 20/2805; B01J 20/3085; B01J 20/18; B65D 81/28; A23L 3/3427
USPC ................. 502/74, 159, 401, 402, 407, 414; 252/380; 426/118
See application file for complete search history.

(56) References Cited

U.S. PATENT DOCUMENTS 3,879,188 A * 4/1975 Fritz ............... A01N 57/00 426/268
5,252,190 A * 10/1993 Sekiguchi ............ A23L 3/3427 204/157.3
2011/0042267 A1 * 2/2011 Hayasaka .............. B01J 29/064 208/27
2013/0251611 A1 9/2013 Wen et al.
2013/0303359 A1 * 11/2013 Ilkenhans ................ A23B 7/00 502/66

FOREIGN PATENT DOCUMENTS

| EP | 1525802 A1 | 4/2005 |
|---|---|---|
| WO | 2007052074 A2 | 5/2007 |
| WO | 2011001186 A1 | 1/2011 |

OTHER PUBLICATIONS

International Preliminary Report on Patentability for International Application No. PCT/IB2016/050401 filed on Jan. 27, 2016 in the name of SAES GETTERS S.P.A.. dated Jan. 1, 2017. 6 pages.
International Search Report for International Application No. PCT/IB2016/050401 filed on Jan. 27, 2016 in the name of SAES GETTERS S.P.A.. (English translation and German original) dated Jan. 31, 2017. 12 pages.
Gulzar Ahmad Nayik et al. "Developments in packaging of fresh fruits—shelf life perspective: A review", American Journal of Food Science and Nutrition Research, Jan. 1, 2014, pp. 34-39.
Smith et al. "A New Palladium-Based Ethylene Scavenger to Control Ethylene-Induced Ripening of Climacteric Fruit", Platinum Metals Review., vol. 53, No. 3, Jul. 1, 2009, pp. 112-122, London, GB.
Terry et al. "Development of New Palladium-Promoted Ethylene Scavenger", Postharvest Biology and Technology, Elsevier, NL, vol. 45, No. 2, May 21, 2007, pp. 214-220.
Auerbach, S.M., et al., "Handbook of Zeolite Science and Technology," (CRC Press 2003), 75 pages.
Meier, W.M., et al., "Zeolite Type Frameworks: Connectivities, Configurations and Conformations." *Molecular Sieves* 2, 141-161 (1999).
Compatibility Chart for Short-term Transport or Storage. http://postharvest.ucdavis.edu/Commodity_Resources/Storage_Recommendations/Compatibility_Chart_for_Short-term_Transport_or_Storage/. Accessed May 21, 2018, 4 pages.
Active Packaging definition, Wikipedia. https://en.wikipedia.org/wiki/Active_packaging (Jan. 2015), accessed May 21, 2018 via www.waybackmachine.org. 6 pages.
Database of Zeolite Structures. *International Zeolite Association.* http://www.iza-structure.org/databases. Accessed May 21, 2018. 1 page.
Paraffin definition, Miriam-Webster. https://www.merriam-webster.com/dictionary/paraffin(May 2013). Accessed May 21, 2018 via www.waybackmachine.org. 3 pages.

* cited by examiner

*Primary Examiner* — Elizabeth D Wood
(74) *Attorney, Agent, or Firm* — Steinfl + Bruno LLP

(57) ABSTRACT

An active package having LTA zeolites exchanged with palladium is described. This solution is capable to improve the quality of the gaseous atmosphere within the package itself, with particular reference to the presence of ethylene. This solution provides improved performance when the package is accidentally exposed to hydrocarbon vapors and provides benefits in terms of reliability in the ethylene control.

14 Claims, No Drawings

ACTIVE PACKAGE

CROSS-REFERENCE TO RELATED APPLICATIONS

The present application is the U.S. National Stage of International Patent Application No. PCT/IB2016/050401 filed on Jan. 27, 2016 which, in turn, claims priority to Italian Patent Application No. MI2015A000131 filed on Feb. 2, 2015.

In a first aspect thereof the invention consists in an active package comprising zeolites having LTA framework, exchanged with palladium.

This solution is capable to improve the quality of the gaseous atmosphere within the package itself, with particular reference to the presence of ethylene, and its performance are less jeopardized when the package is accidentally exposed to hydrocarbon vapors.

Generally speaking the use of exchanged, impregnated or doped zeolites in association with various catalyst metals is known in different fields of application, such as for the catalytic remediation of nitrogen oxides, as disclosed in the US patent application number 2013/0251611.

The problems caused by ethylene in transport and storage of fresh food and vegetables are well known, as for example illustrated in the poster presentation "Compatibility chart for fruits and vegetables in short-term transport or storage" by Thompson, J., A. Kader, and K. Sylva made in 1996, Oakland: Univ. Calif. Div. Ag. and Nat. Res. Publ. 21560 (poster), detailing a desired target threshold of 1 ppm level of ethylene within the fresh food package and Andrew W. J. Smith et al. in 2009 reported that ethylene (typically <0.1-1.0 μl l$^{-1}$) can initiate ripening in many climacteric fruit which then can lead to autocatalytic production of ethylene by the fruit ("A new palladium-based ethylene scavenger to control ethylene-induced ripening of climacteric fruit", Platinum Metals Review. vol. 53, no. 3, pages 112-122). Smith and al. is silent about a specific type of zeolite to be considered as preferable. Similarly, no hint to select them can be found in other scientific papers available in the prior art, as for example "Development of new palladium-promoted ethylene scavenger" by Terry et al. published in 2007 on Postharvest Biology and Technology (vol. 45, no. 2, pages 214-220).

The problem of VOC (Volatile Organic Compound) removal, with reference also to ethylene, from fruits and vegetables packages is moreover described and addressed in the international patent publications WO 2007/052074 and WO 2011/001186, disclosing a specific type of zeolite, ZSM-5 doped with palladium, whereas use of hydrophobic zeolites for the same problem and application is instead disclosed in the European patent application 1525802. ZSM-5 zeolites are disclosed as preferably being calcined and obtained in acid form (commonly labeled as "ZSM-5 (H)").

One of the issues specifically linked to fresh food preservation, with particular reference to fresh fruit and vegetables, is not only the capability to efficiently remove therefrom, or at least control within, the level of ethylene, but also the maintaining of such property also in the presence of widely varying environmental conditions, such as temperature, humidity, and other gasses.

Purpose of the present invention is to overcome the drawbacks still present in the prior art in terms of reliability in the ethylene control and in a first aspect thereof consists in an active package containing LTA zeolites exchanged with palladium, wherein the amount of palladium is comprised between 0.1 wt % and 5 wt %, preferably said palladium amount is comprised between 0.5 wt % and 2.5 wt %.

Such palladium wt % loading is to be considered as average on the total amount of zeolites present in the active package.

The term LTA zeolites is well known in the technical filed and indicates a Linde Type A structure. It has a 3-dimensional pore structure with pores running perpendicular to each other in the x, y, and z planes, and is made of secondary building units 4, 6, 8, and 4-4. The pore diameter is defined by an eight member oxygen ring and is small at 4.2 Å. This leads into a larger cavity of minimum free diameter 11.4 Å. The cavity is surrounded by eight sodalite cages (truncated octahedra) connected by their square faces in a cubic structure. In case of LTA-Na, the presence of Na+ cation in the extra-framework structure induces hydrophilic behavior and makes these materials suitable for water interactions. LTA-Na zeolites can be modified in acid form by wet impregnation method using ammonium salts solution and subsequently performing a calcination process.

It is important to underline that the present invention is focused on a specific type of zeolite framework, the LTA, so a very well identified and specific element in the vast choice of possible zeolite materials, see for example table 1 of "Zeolite Type Frameworks: Connectivities, Configurations and Conformations", Molecular Sieves, Vol. 2, 1999, listing about 100 different types of zeolites, including LTA and ZSM-5 or refer to "Handbook of Zeolite Science and Technology", Scott M. Auerbach, Kathleen A. Carrado, Prabir K. Dutta, CRC Press, July 2003 and to "Database of Zeolite Structures" of International Zeolite Association (IZA-SC) (http://www.iza-structure.org/databases/) where more than 230 different zeolites framework types are listed.

The amount of zeolites per package varies widely in dependence from the type, amount and target lifetime of the perishable food, as well the package volume, so the invention is not limited to only one specific amount; notwithstanding this consideration, typical values for the amounts of palladium exchanged zeolites within the active packages are usually comprised between 0.3 μg and 30 μg per gram of weight of the perishable fresh food.

Preferably the palladium exchanged zeolites contained in the active package according to the present invention are in the form of powders, with an average size comprised between 50 nm and 500 μm. The term size indicates for particles of irregular shape, the biggest dimension.

Granulometric particle size analysis is evaluated by laser diffraction technique. The definitions and the considerations about laser diffraction theory and practice are derived from the standard ISO 13320-1. Laser diffraction results are reported in volume distribution where the influence of the big particles in the distribution is relevant. Even more preferably the palladium exchanged zeolites are in form of powders, in this case the size is mainly (X75<5 μm) comprised between and 50 nm and 5 μm and at least 50% of the zeolites are below 3 μm. This type of powders is particularly useful to assure a uniform sorption behavior and ease of integration into the active package.

The preferred use for micrometric (5-500 μm) palladium exchanged zeolites, comprising the LTA ones, is within permeable bags inside the active package. Even if the invention is not limited to a specific bag material or constituent, preferred is the use of low density polyethylene (LDPE), high density polyethylene (HDPE), polypropylene (PP), ethylene-vinyl acetate (EVA), styrene-ethylene-butylene-styrene (SEBS), polylactic acid (PLA), polyesters.

The preferred use for finer particles (50 nm-5 μm) palladium exchanged zeolites is dispersed in a suitable polymeric material or a binder. Even if the invention is not limited to a specific polymeric or constituent, preferred is the use of acrylics, acrylics-styrene, -vinyl, and -alkyd copolymers, urethane-acrylics, aliphatic-urethane, urethanes, polyesters, epoxies, polyurethanes, polyamides, melamine, phenolic resins, polystyrene, ethylene vinyl alcohol (EVOH), polyvinyl alcohol (PVA), waterborne or water reducible latex.

The preferred use of palladium exchanged LTA zeolites powders, being them micrometric or sub-micrometric, dispersed in a polymeric material is in form of a composite film having average thickness comprised between 5 and 50 µm, in this case the maximum size of the zeolite powders should be equal to or less than one tenth of the film thickness for a fresh system, this typically translates into a film in use where powders tends to aggregate over time and therefore may form clusters up to one half of the film thickness.

Even though the present invention is not limited to a specific wt % loading amount of the exchanged zeolites in the polymeric material, a suitable range is comprised between 0.01 wt % and 20 wt %. The highest range (10 wt %-20 wt %) is advantageous when there are space limitation in the active package for the composite films, the lowest one (0.01 wt %-5 wt %) when other characteristics for the active packages are sought, such as the composite film transparency, semitransparency or haze level below 10%.

Such a film may be affixed to an inner surface of the active package or may be a constituent portion of the package itself (i.e. the removable cover).

Even though the use of palladium exchanged LTA zeolites is particularly useful within active packages, those could also be advantageously employed in other technical fields where ethylene removal capability is required even in the presence of high humidity conditions or when ethylene is concurrently present with other hydrocarbons that, when sorbed by the zeolites, can jeopardize to an unpredictable extent the effectiveness and lasting of the control of ethylene in the packaging containing the fruits.

The invention will be further illustrated with the following non limiting examples.

EXAMPLE 1—SAMPLE PREPARATIONS

Sample 1 (S1)

Palladium exchanged LTA zeolites were prepared using ion exchange process. LTA zeolites used have an average size comprised between 100 nm and 10 µm, with 50% of the zeolites below 2 µm and 75% below 5 µm.
10 g of zeolites were dispersed in a solution of a palladium salt (e.g nitrate salt or chloride salt), then filtered on a nylon membrane and thermally treated to promote the solvent evaporation.
Resulting palladium exchanged amount is about 1.5 wt % by weight over the LTA zeolites weight, as evaluated by ICP Mass Spectrometry.

Sample 2 (S2)

LTA-H zeolites were prepared using ion exchange process, starting from LTA-Na zeolites with particle size below 5 µm (X75). 20 g of zeolites were added to aqueous solution of $NH_4NO_3$. The suspension was stirred at room temperature, and then was filtered with a 0.45 mm membrane filter and finally dried in an oven. The isothermal treatments, on ammonium-exchanged zeolite, were carried out in the air by furnace, at 500° C. for 5 h, to achieve LTA-H.
The ICP analysis showed a decrease in the content of Na in zeolites LTA-H as expected. The amount of Na in LTA-Na is 14.0% wt instead in LTA-H is about 5.2% wt. Palladium exchanged LTA-H zeolites were prepared using the same process previously reported for sample 1 (S1).

Comparative Samples C1-C3

Some comparative samples were different type of "raw" (not exchanged with palladium) zeolites. LTA-Na, ZSM-5 ($NH_4$) and Faujasite (Na) were selected.

Comparative Sample C4

A comparative sample palladium exchange ZSM-5 (H) was obtained, first, by thermal treatment, at 500° C. for 5 h in air, of the sample ZSM-5 ($NH_4$) (C2) and then, by ion exchange process as follows. 10 g of ZSM-5 (H) zeolites were dispersed in a solution of a palladium salt, later filtered on a nylon membrane and dried in an oven at 100° C. overnight.

All samples that have been described above are summarized in table 1

TABLE 1

| Sample ID | Zeolite type | Size (X50) | Size (X75) | Pd exchanged |
|---|---|---|---|---|
| S1 | LTA-No | 2.0 µm | 5.0 µm | Y (1.5 wt %) |
| S2 | LTA-H | 2.0 µm | 5.0 µm | Y (1.5 wt %) |
| C1 | LTA-Na | 2.0 µm | 5.0 µm | N |
| C2 | ZSM-5 ($NH_4$) | 4.9 µm | 7.0 µm | N |
| C3 | Faujasite (Na) | 4.0 µm | 6.0 µm | N |
| C4 | ZSM-5 (H) | 5.0 µm | 7.0 µm | Y (1.5 wt %) |

EXAMPLE 2

Different types of zeolites (S1, C1-C4) were tested under different conditions. Measurements were carried out in a microbalance with conditioned sample chamber. Zeolites (10 mg) were activated at 180° C. under vacuum overnight and then tested under $C_2H_4$ 10 mbar partial pressure and different humidity level.

The obtained results are reported in table 2.

TABLE 2

| | $C_2H_4$ % wt @ 22° C. - dry | $C_2H_4$ % wt @ 22° C. - 15 mbar $H_2O$ |
|---|---|---|
| S1 | 2.2 | 0.30 |
| C1 | 2.3 | Negligible |
| C2 | 2.1 | Negligible |
| C3 | 0.65 | negligible |
| C4 | 8.27 | 1.38 |

Among the prepared and tested samples, only samples S1 and C4 are capable to maintain an acceptable ethylene removal capability in the presence of a high humidity level, even if a capacity loss of about 80% has been observed if compared to anhydrous conditions, for both samples S1 and C4.

EXAMPLE 3 (HYDROPHOBICITY TUNING)

Different types of LTA zeolites were tested under $H_2O$ partial pressure to determine the hydrophilic affinity. Measurements were carried out in a microbalance with conditioned sample chamber. Zeolites were activated at 180° C. under vacuum overnight and then equilibrated under nitrogen atmosphere before introducing the $H_2O$ pressure. Sorption results have been reported in table 3.

TABLE 3

| Sample ID | $H_2O$ Sorption capacity (15 mbar) |
|---|---|
| S1 | 18.0% wt |
| S2 | 4.4% wt |

Sample S2 shows a lower $H_2O$ sorption capacity revealing a lower hydrophilic behavior. In case of ethylene gettering activity, this sample is able to ensure lower $H_2O$ competition. This confirms that, when required, LTA zeolites can be obtained in acid form, limiting the jeopardizing effect of high humidity on the sorption of ethylene molecules.

EXAMPLE 4 (CYCLOHEXANE CONTAMINATION)

Different types of zeolites (S1, S2 and C4) were tested under cyclohexane partial pressure. For a critical set of characteristics (molecule critical diameter, vapor density, liquid density, vapor pressure, and boiling point) cyclohexane can be adopted like a tester molecule to evaluate the sorption capacity of adsorbing materials like zeolites for all the typical volatile organic compounds (VOCs) released by transportation fuels. A list of these typical VOCs includes aromatics (i.e. benzene, ethylbenzene, p-, m-xylene, o-xylene) and cycloalkanes (i.e. cyclohexane, methyl cyclohexane).

Measurements were carried out in a microbalance with conditioned sample chamber. Zeolites were activated at 180° C. under vacuum overnight and then equilibrated under nitrogen atmosphere before introducing the $C_6H_{12}$ pressure.

Table 4 shows gravimetric test results regarding the quantitative evaluation of the cyclohexane adsorption for samples 1 and 2, and comparative sample 4, with comparable level of sample exposure to the cyclohexane vapors (0.1 mbar partial pressure).

TABLE 4

| Sample ID | $C_6H_{12}$ Sorption capacity (0.1 mbar) |
|---|---|
| S1 | 0.21 |
| S2 | 0.13 |
| C4 | 4.16 |

Despite the bigger accessible volume for samples S1 and S2 (21.43% vs. 9.81%) due to the zeolite framework characteristics, Pd-exchanged LTA zeolites show a lower sorption capacity (one order of magnitude) for cyclohexane than Pd-exchanged ZSM-5 (H) zeolites (sample C4).

The results we have reported in table 4 demonstrate that LTA zeolites can work as sorber material for ethylene minimizing the risk of contamination by other VOC's present under typical fruit transportation conditions. High $C_6H_{12}$ sorption capacity for samples C4 reveals for it a stronger competition of VOCs for ethylene gettering, i.e. a correspondent loss in ethylene sorption capacity (about a 50% loss if compared to the C4 sorption capacity reported in example 1).

LTA zeolites (S1 and S2) have shown a limited absorption of cyclohexane: the decrease of their sorption capacity of ethylene can be therefore estimated in the range of 5% (S2) to 10% (S1) if compared to sorbed amount in the anhydrous conditions of example 1.

As a consequence, when a manufacturer has to design a getter system containing at least a component of LTA zeolites he can reduce the introduction of zeolites in excess, that is required in a massive amount for ZSM-5 zeolites in order to prevent accidental contamination during transport: this involves evident advantages in terms of both cost saving and manufacturing conditions.

The invention claimed is:

1. A food package configured for ethylene control or removal containing LTA zeolites in the form of powders with average size comprised between 50 nm and 500 µm exchanged with palladium, wherein the amount of palladium is comprised between 0.1 wt % and 5 wt % and said powders are contained in a permeable bag placed within the package.

2. The food package according to claim 1, wherein said LTA zeolites are present in an amount greater than 75% in weight of the total zeolite content.

3. The food package according to claim 1, wherein an amount of exchanged zeolite is comprised between 0.3 µg and 30 µg per gram of weight of a perishable fresh food.

4. The food package according to claim 1, wherein the material for the permeable bag is selected from the group consisting of low density polyethylene (LDPE), high density polyethylene (HDPE), polypropylene (PP), ethylene-vinyl acetate (EVA), styrene-ethylene-butylene-styrene (SEBS), polylactic acid (PLA), and polyesters.

5. A food package configured for ethylene control or removal containing LTA zeolites in the form of powders with average size comprised between 50 nm and 500 µm exchanged with palladium, wherein the amount of palladium is comprised between 0.1 wt % and 5 wt % and said powders are dispersed in a polymeric material.

6. The food package according to claim 5, wherein said polymeric material is selected from the group consisting of acrylics, acrylics-styrene, -vinyl, and -alkyd copolymers, urethane-acrylics, aliphatic-urethane, urethanes, polyesters, epoxies, polyurethanes, polyamides, melamine, polystyrene, phenolic resins, ethylene vinyl alcohol (EVOH), polyvinyl alcohol (PVA), and waterborne or water reducible latex.

7. The food package according to claim 5, wherein said polymeric material containing the dispersed powders is in the form of a film having thickness comprised between 5 and 50 µm.

8. The food package according to claim 7, wherein the wt % of LTA palladium exchanged zeolites with respect to the film weight is comprised between 0.01 wt % and 20 wt %.

9. The food package according to claim 8, wherein the wt % of palladium exchanged zeolites with respect to the film weight is comprised between 10 wt % and 20 wt %.

10. The food package according to claim 8, wherein the wt % of LTA palladium exchanged zeolites with respect to the film weight is comprised between 0.01 wt % and 5 wt %.

11. The food package according to claim 7, wherein said film is attached onto an inner surface of the active package.

12. The food package according to claim 7, wherein said film is a constituent portion of the active package itself.

13. The food package according to claim 5, wherein said LTA zeolites are present in an amount greater than 75% in weight of the total zeolite content.

14. The food package according to claim 5, wherein an amount of exchanged zeolite is comprised between 0.3 µg and 30 µg per gram of weight of a perishable fresh food.

* * * * *